US012635618B2

(12) United States Patent
Kim

(10) Patent No.: US 12,635,618 B2
(45) Date of Patent: May 26, 2026

(54) APPARATUS FOR TREE PROTECTION AND TREE DISASTER PREVENTION

(71) Applicant: VORIM INC., Yongin-si (KR)

(72) Inventor: Dohoon Kim, Seoul (KR)

(73) Assignee: Vorim Inc., Yongin-si (KR)

( * ) Notice: Subject to any disclaimer, the term of this patent is extended or adjusted under 35 U.S.C. 154(b) by 0 days.

(21) Appl. No.: 19/007,836

(22) Filed: Jan. 2, 2025

(65) Prior Publication Data

US 2025/0212737 A1 Jul. 3, 2025

(30) Foreign Application Priority Data

Jan. 2, 2024 (KR) ........................ 10-2024-0000356

(51) Int. Cl.
*A01G 13/23* (2025.01)
*A01G 25/02* (2006.01)

(52) U.S. Cl.
CPC ............. *A01G 13/23* (2025.01); *A01G 25/02* (2013.01)

(58) Field of Classification Search
CPC ........ A01G 13/23; A01G 13/20; A01G 13/28; E04H 17/16; E04H 17/1602
See application file for complete search history.

(56) References Cited

U.S. PATENT DOCUMENTS

| | | | | |
|---|---|---|---|---|
| 2,015,471 | A * | 9/1935 | Genuit | A01G 13/24 |
| | | | | 47/29.5 |
| 11,286,687 | B2 * | 3/2022 | Springborn | E06B 11/02 |
| 2008/0179577 | A1 * | 7/2008 | Neusch | E04H 17/16 |
| | | | | 256/1 |
| 2009/0152523 | A1 * | 6/2009 | Erwin | E04H 17/1602 |
| | | | | 256/24 |

FOREIGN PATENT DOCUMENTS

| | | | | | | |
|---|---|---|---|---|---|---|
| AU | 716241 | B2 * | 2/2000 | ............. | A01G 13/28 |
| CN | 113668945 | A * | 11/2021 | ............. | E04H 17/22 |
| CN | 113982369 | A * | 1/2022 | ............. | E04B 1/343 |
| DE | 202023002375 | U1 * | 12/2023 | ............. | A01G 13/23 |
| GB | 2273117 | A * | 6/1994 | ........ | E04H 17/1602 |
| KR | 200180159 | Y1 * | 4/2000 | ............. | A01G 13/23 |
| KR | 10-2009-0036364 | A | 4/2009 | | |
| KR | 20110056756 | A * | 5/2011 | ............. | A01G 13/23 |
| KR | 101165394 | B1 * | 7/2012 | ............. | A01G 13/23 |
| KR | 20130009109 | A * | 1/2013 | | |
| KR | 101277062 | B1 * | 6/2013 | ............. | A01G 9/28 |
| KR | 20150034321 | A * | 4/2015 | ............. | E04G 21/32 |

(Continued)

*Primary Examiner* — Magdalena Topolski
(74) *Attorney, Agent, or Firm* — Reising Ethington P.C.

(57) ABSTRACT

An apparatus for tree protection and tree disaster prevention includes a plurality of supports that are provided with a predetermined spacing distance, a blocking part that is fixed by the plurality of supports, and a sealing support part that is interlocked and supported between the plurality of supports and inserted into the blocking part. The apparatus for tree protection and tree disaster prevention has effects of implementing ease of construction at a work site by uniformly and densely providing a plurality of through holes and increasing supporting force and resilience of the blocking wall, and enhance noise blocking, heat preservation, and shock absorption functions by manufacturing the blocking wall in the form of an air pocket.

7 Claims, 7 Drawing Sheets

(56) References Cited

FOREIGN PATENT DOCUMENTS

| | | | | | |
|---|---|---|---|---|---|
| KR | 20160001708 | U | * | 5/2016 | ............. A01G 13/35 |
| KR | 20180097366 | A | * | 8/2018 | ......... E04H 17/1426 |
| KR | 20180002618 | U | * | 9/2018 | ............. E04H 17/16 |
| KR | 20180109476 | A | * | 10/2018 | ......... A01G 13/0237 |
| KR | 20190112408 | A | * | 10/2019 | ......... A01G 13/0225 |
| KR | 102180967 | B1 | * | 11/2020 | ............. A01G 13/23 |
| KR | 102568826 | B1 | * | 8/2023 | ............. E01F 15/02 |
| KR | 102621103 | B1 | * | 1/2024 | ............. A01G 13/00 |

* cited by examiner

APPARATUS FOR TREE PROTECTION AND TREE DISASTER PREVENTION

CROSS-REFERENCE TO RELATED APPLICATIONS

The present application claims priority to Korean Patent Application No. 10-2024-0000356, filed on Jan. 2, 2024, the entire contents of which is incorporated herein for all purposes by this reference.

TECHNICAL FIELD

The present disclosure relates to an apparatus for tree protection and tree disaster prevention, and more particularly, to an apparatus for tree protection and tree disaster prevention that includes functions to prevent and manage frost damage, salt damage, injury, and drought damage, and protects planted trees from deicers, smoke, and rainwater splashes when installed on a roadside.

BACKGROUND OF THE DISCLOSURE

Flower pots or trees exposed outdoors consume excessive manpower and costs to be safely protected from various disasters such as frost damage, salt damage, injury, and drought damage. Trees managed by individuals and street trees and flower beds maintained and managed by the public may easily die when they are not managed at an appropriate time and with an appropriate method, and therefore, an efficient management device is necessary. Trees are protected using conventional products such as vinyl material or thick straw mats that individually wrap the trees, but the conventional products had a poor fixing device, which not only failed to perform their intended functions but also resulted in excessive consumption of manpower and costs.

Meanwhile, harmful substances, such as dust, fine dust, exhaust gases, and calcium chloride, due to vehicle are accumulated and collected on the roadside, and these harmful substances are scattered or splashed by wind, rain, snowfall, and snow removal vehicles, etc., that occur when vehicles are passing.

To solve these problems, public institutions are creating flower beds along a road to block some of the harmful substances, but the harmful substances are directly attached to planted trees to hinder the growth of plants, and in winter, plants are fatally damaged by salt due to deicers sprayed on a roadside. In addition, these harmful substances threaten the respiratory health of pedestrians, and there are many complaints about rain splashing by vehicles.

Conventionally, the thick straw mat has been used as a blocking material, but there is a problem in that the thick straw mat has many gaps to make it difficult to block harmful substances, is bulky to make it inconvenient to transport and store, has a poor fixing device to require excessive manpower, and is prone to collapsing in wind and rain.

In addition, the conventional products have difficulty in sealing and blocking gaps, and therefore, have a problem in that incoming pollutants and deicers penetrate trees inside a blocking wall, causing fatal damage to the trees. In particular, the conventional products have poor cold-resistant functions, making it difficult to prevent damage to trees from cold dry wind.

In addition, the conventional products simply change a surface used as the blocking wall from a straw material to a general synthetic resin. Since structures of a support and a blocking surface are the same, the conventional products have the more serious problem of requiring excessive manpower and easily collapsing due to wind.

Therefore, a product for solving these problems is required.

Related Art Document is Korean Patent Laid-Open Publication No. 10-2009-0036364.

SUMMARY OF THE INVENTION

The present disclosure provides an apparatus for tree protection and tree disaster prevention capable of protecting and managing flower beds and flower pots or protecting trees and pedestrians planted in roadside flower beds from deicers, smoke, and rainwater splashes.

The present disclosure provides an apparatus for tree protection and tree disaster prevention capable of preventing cold dry wind damage of trees vulnerable to frost damage by improving cold-resistant function.

In addition, the present disclosure provides a structure capable of preventing and managing drought damage by including a drip irrigation function mounted thereon.

In addition, the present disclosure provides an air pocket function to prevent injury and increase insulation effect to prevent frost damage.

An apparatus for tree protection and tree disaster prevention according to an embodiment of the present disclosure includes: a plurality of supports that are provided with a predetermined spacing distance; a blocking part that is fixed by the plurality of supports; and a sealing support part that is interlocked and supported between the plurality of supports and inserted into the blocking part.

In the apparatus for tree protection and tree disaster prevention according to an embodiment of the present disclosure, the blocking wall may include a plurality of through holes or pockets formed by thermally compressing a front sheet that is provided in the front and forms multiple curves and has an extension connected to a lower portion and a rear sheet that is provided in the rear.

In the apparatus for tree protection and tree disaster prevention according to an embodiment of the present disclosure, a surface of the front sheet may be a corona-treated surface.

In the apparatus for tree protection and tree disaster prevention according to an embodiment of the present disclosure, the front sheet and the rear sheet may be formed of a polyethylene-based material and a material containing an amine-based light stabilizer.

In the apparatus for tree protection and tree disaster prevention according to an embodiment of the present disclosure, the front sheet and the rear sheet may be formed of the polyethylene-based material and a material containing the amine-based light stabilizer and a benzene-based UV stabilizer.

In the apparatus for tree protection and tree disaster prevention according to an embodiment of the present disclosure, the drip irrigation unit may include a drip tube that is through-connected to a lower portion of the rear sheet corresponding to the pocket; a control valve provided in a middle of the drip tube; and an insertion tube provided at an end portion of the drip tube.

In the apparatus for tree protection and tree disaster prevention according to an embodiment of the present disclosure, the sealing support part may include: a support rod that is positioned between the supports; both end portions of the support rod that are provided with fastening holes inserted into end portions of the supports; and a plurality of sealing protrusions that are inserted into each of the through holes of the blocking wall between the supports along a lower surface of the support rod.

In the apparatus for tree protection and tree disaster prevention according to an embodiment of the present disclosure, the support may have a screw shape at an upper end portion, and the upper end portion of the screw shape may be connected to the support constituting an upper apparatus for tree protection and tree disaster prevention through a fastening member to form a two-stage apparatus for tree protection and tree disaster prevention.

In the apparatus for tree protection and tree disaster prevention according to an embodiment of the present disclosure, the support may be formed by bending an arbitrary upper position forward at a predetermined angle.

In the apparatus for tree protection and tree disaster prevention according to an embodiment of the present disclosure, the support may be provided in the form of a rod using galvanized steel wire or hard drawn steel wire.

Features and advantages of the present disclosure will be more obvious from the following description with reference to the accompanying drawings.

The terms and words used in the present specification and claims should not be interpreted as being limited to typical meanings or dictionary definitions, but should be interpreted as having meanings and concepts relevant to the technical spirit of the present disclosure based on the rule according to which an inventor can appropriately define the concept of the term to describe most appropriately the best method he or she knows for carrying out the disclosure.

The apparatus for tree protection and tree disaster prevention according to an embodiment of the present disclosure can completely block the gap formed at the bottom of the blocking wall by the extension, thereby preventing fatal damage to the root part of the tree from occurring.

The apparatus for tree protection and tree disaster prevention according to an embodiment of the present disclosure can implement ease of construction at a work site by uniformly and densely providing the plurality of through holes and increasing the supporting force and resilience of the blocking wall, and enhance the noise blocking, heat preservation, and shock absorption functions by manufacturing the blocking wall in the form of the air pocket.

The surface of the apparatus for tree protection and tree disaster prevention according to an embodiment of the present disclosure is formed of the front and rear surfaces (two layers), so it is possible to strengthen functions by using different materials, specifications, and processing methods and maximize a predetermined effect by extending the length of the front part. The processing method of the product provides the space in which the supports are sealed each other to be inserted and the space for fixing the supports and blows air, so it is possible to enhance the heat preservation effect, noise blocking, cold dry wind blocking, shock absorption functions, etc.

The apparatus for tree protection and tree disaster prevention according to an embodiment of the present disclosure can protect trees and pedestrians planted in the roadside flower beds from the deicers, smoke, and rainwater splashes, and protect and manage the flower beds and individual flower pots from the frost damage or drought damage.

DETAILED DESCRIPTION OF THE INVENTION

Figure 1:
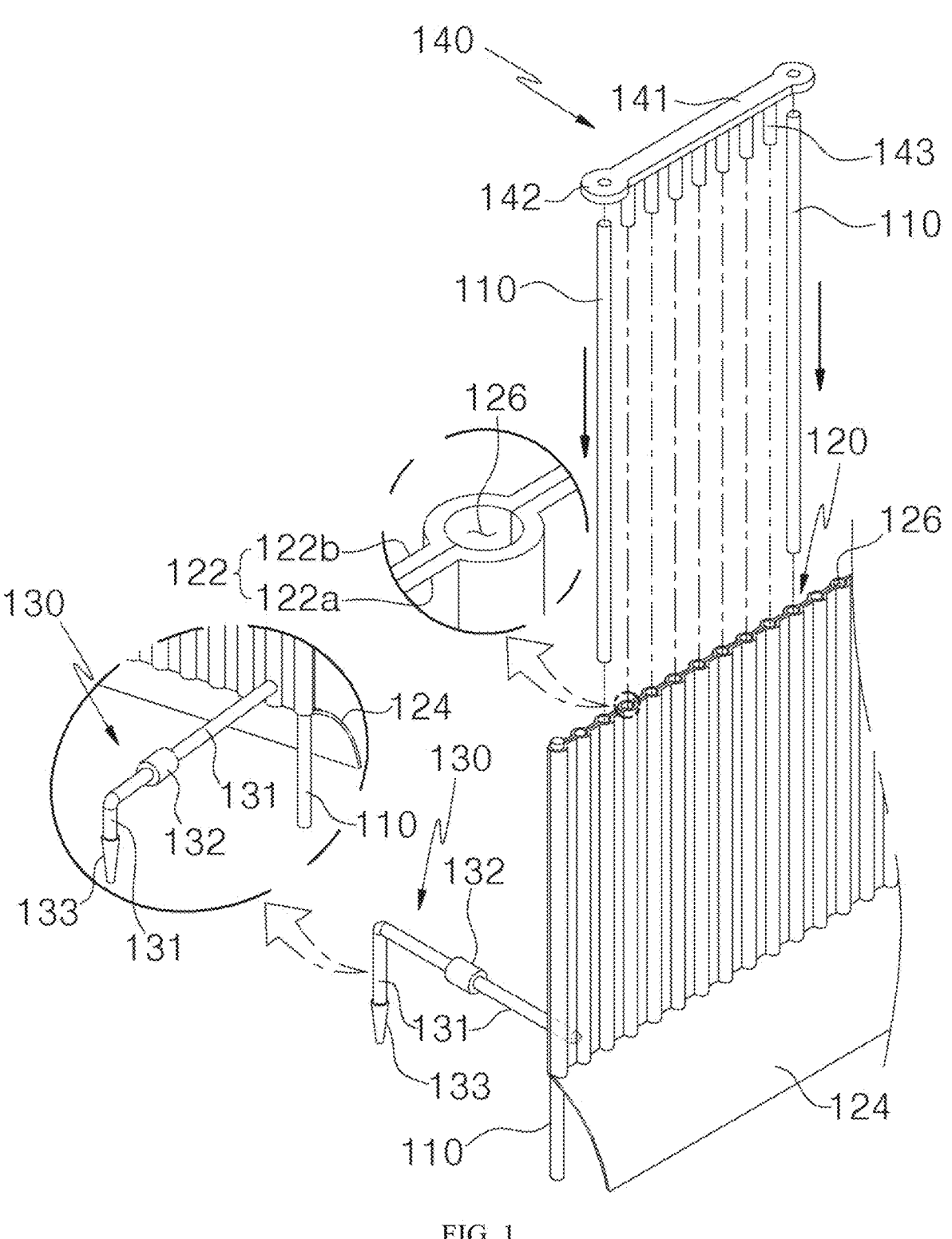
FIG. 1 is an exploded perspective view of an apparatus for tree protection and tree disaster prevention according to an embodiment of the present disclosure.

The objects, specific advantages, and novel features of the present disclosure will become more apparent from the following detailed description and preferred embodiments in conjunction with the accompanying drawings. In the specification, in adding reference numerals to components throughout the drawings, it is to be noted that like reference numerals designate like components even though components are shown in different drawings. Further, terms used in the specification, 'first', 'second', etc., can be used to describe various components, but the components are not to be construed as being limited to the terms. The terms are used to distinguish one component from another component. Further, when it is determined that the detailed description of the known art related to the present disclosure may obscure the gist of the present disclosure, the detailed description thereof will be omitted.

Figure 2:
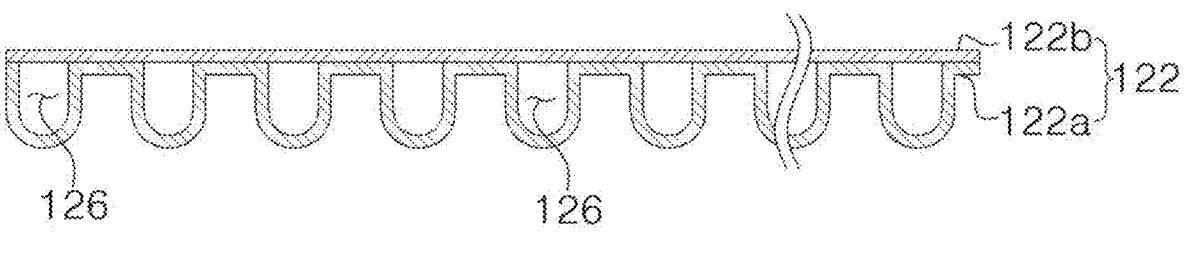
FIG. 2 is a cross-sectional view of a blocking part constituting the apparatus for tree protection and tree disaster prevention according to an embodiment of the present disclosure.
Figure 3:
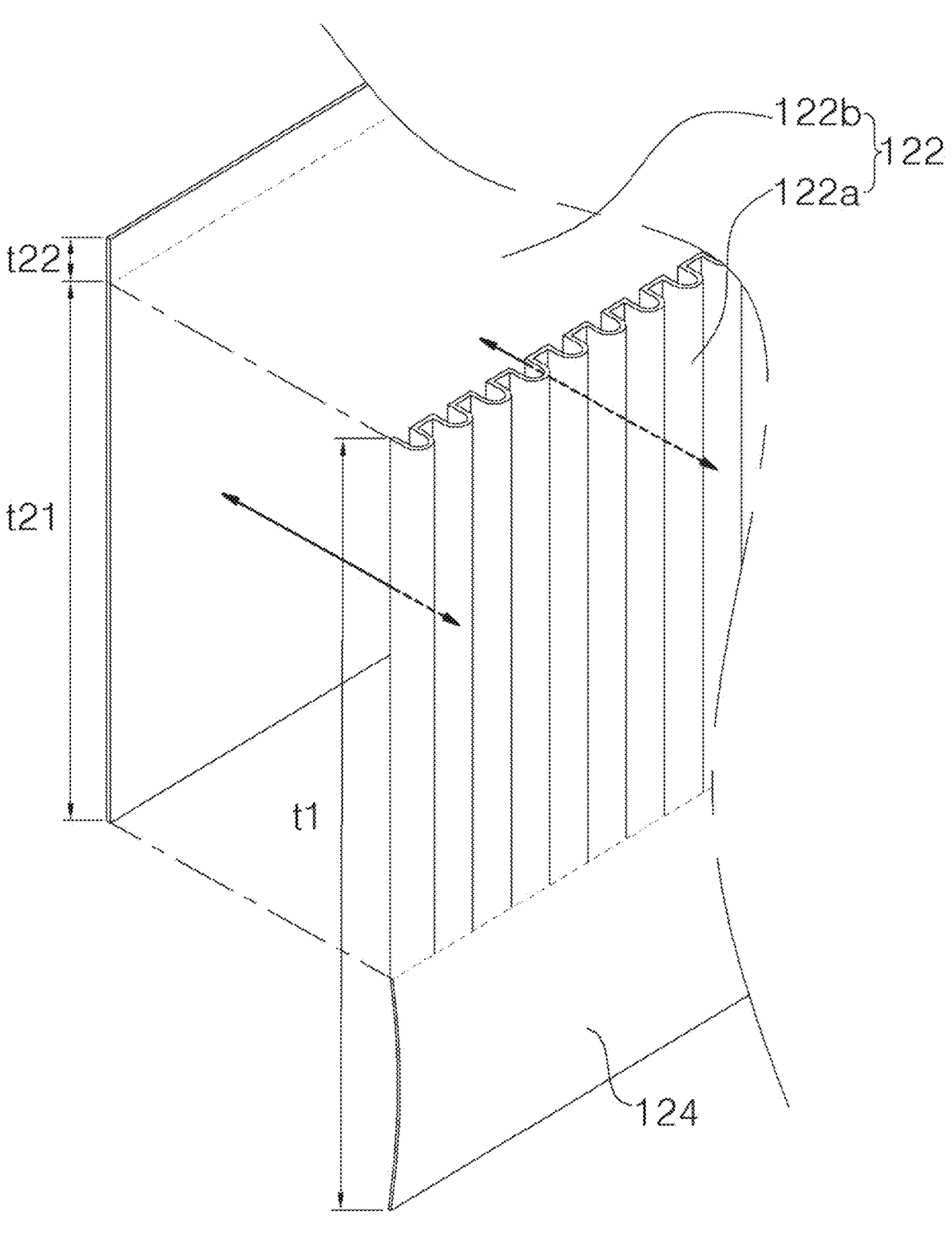
FIG. 3 is an exploded perspective view of the blocking part constituting the apparatus for tree protection and tree disaster prevention according to an embodiment of the present disclosure.
Figure 4:
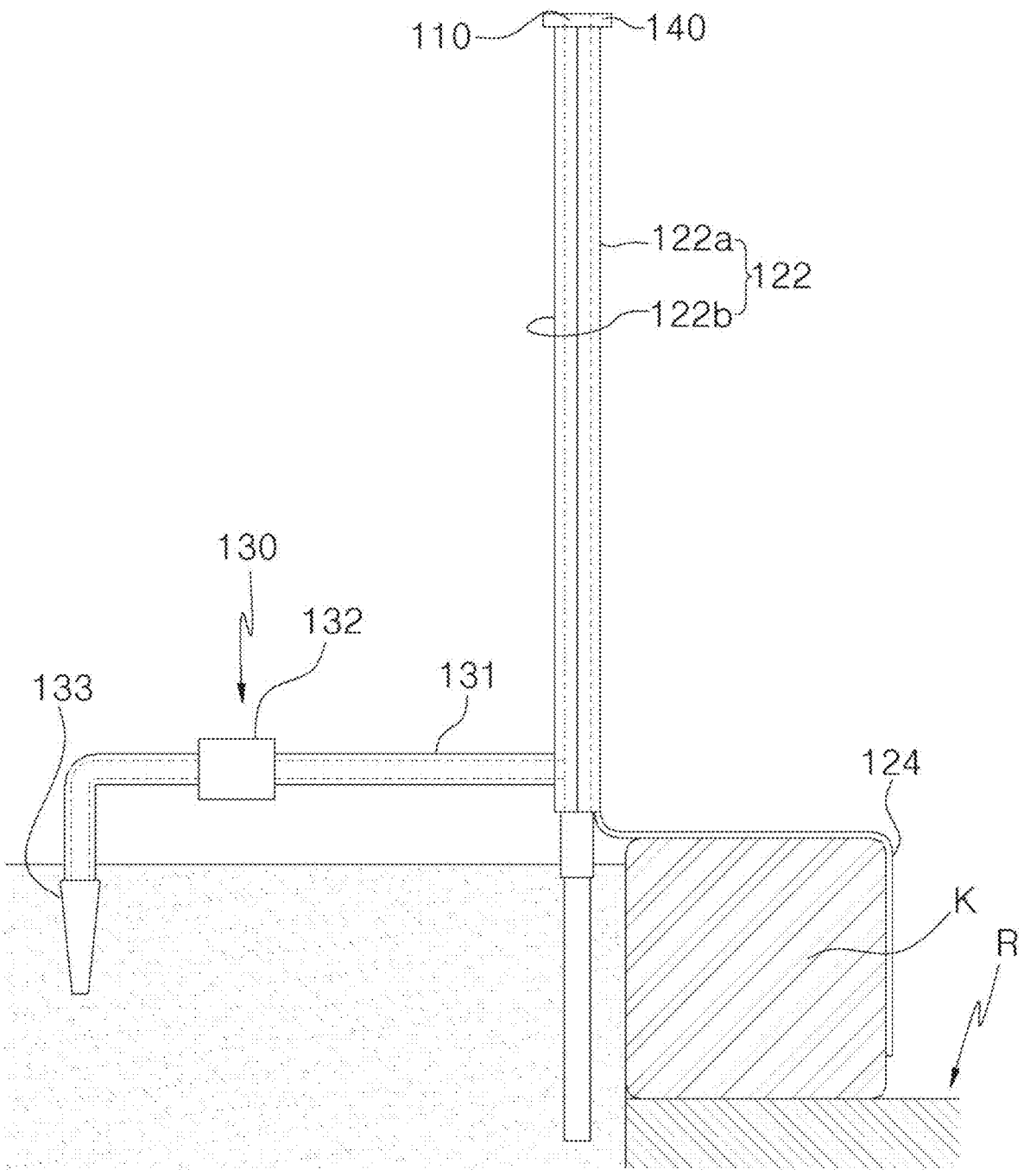
FIG. 4 is an exemplary cross-sectional view illustrating an appearance in which the apparatus for tree protection and tree disaster prevention according to an embodiment of the present disclosure is installed adjacent to a curb.
Figure 5:
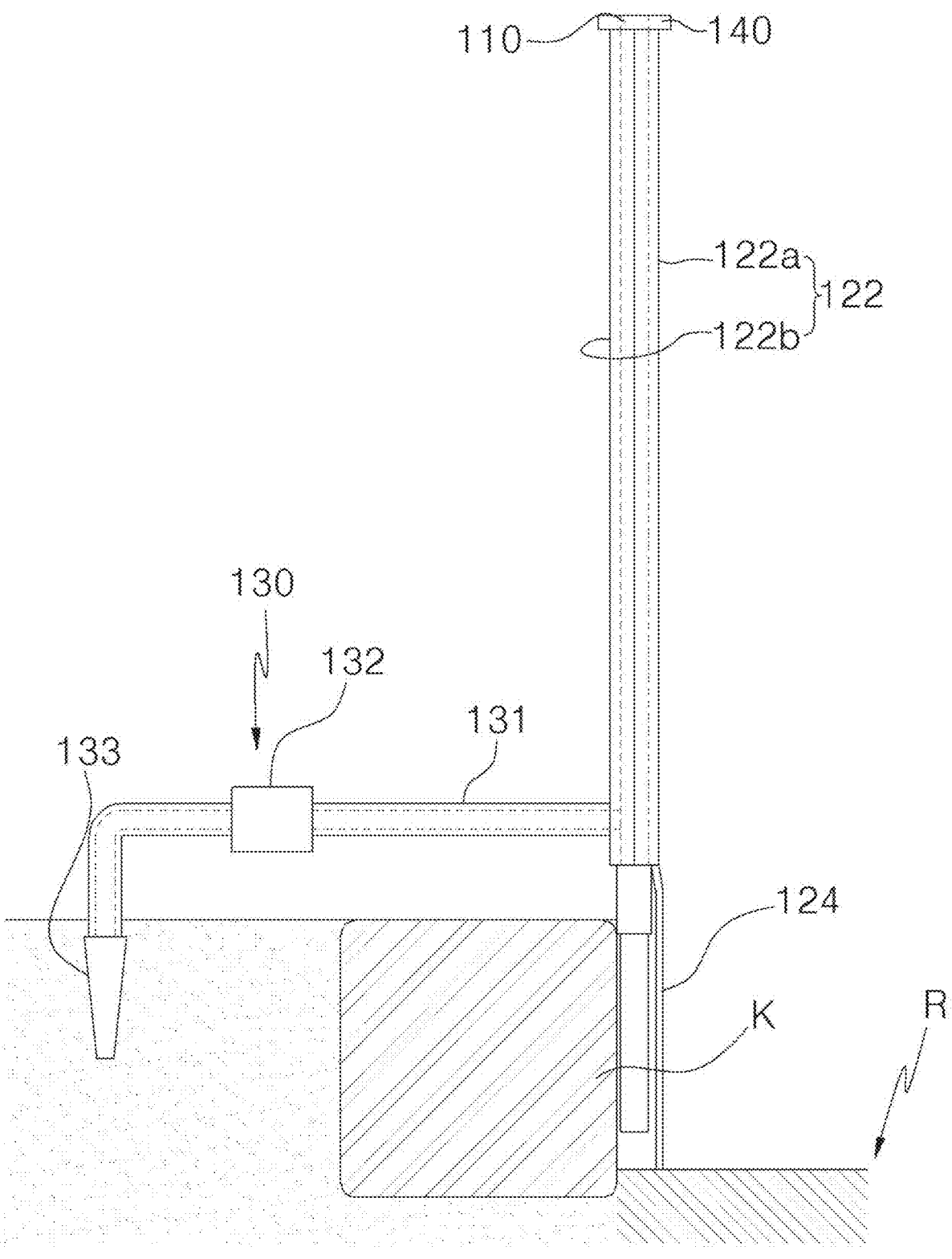
FIG. 5 is an exemplary cross-sectional view illustrating an appearance in which the apparatus for tree protection and tree disaster prevention according to an embodiment of the present disclosure is installed on the curb.
Figure 6:
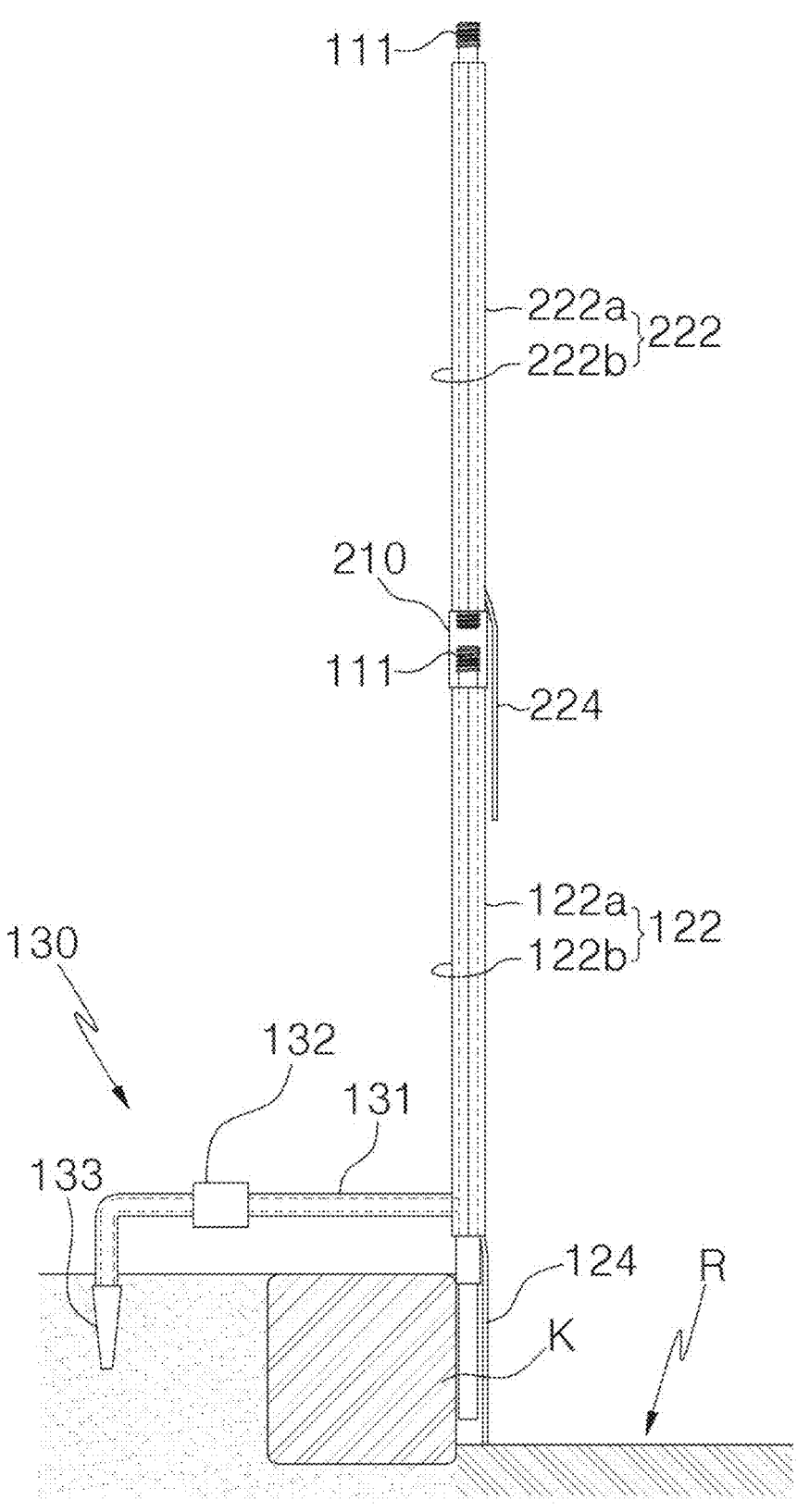
FIG. 6 is an exemplary cross-sectional view illustrating an appearance in which an apparatus for tree protection and tree disaster prevention according to another embodiment of the present disclosure is installed on a curb in two stages.
Figure 7:
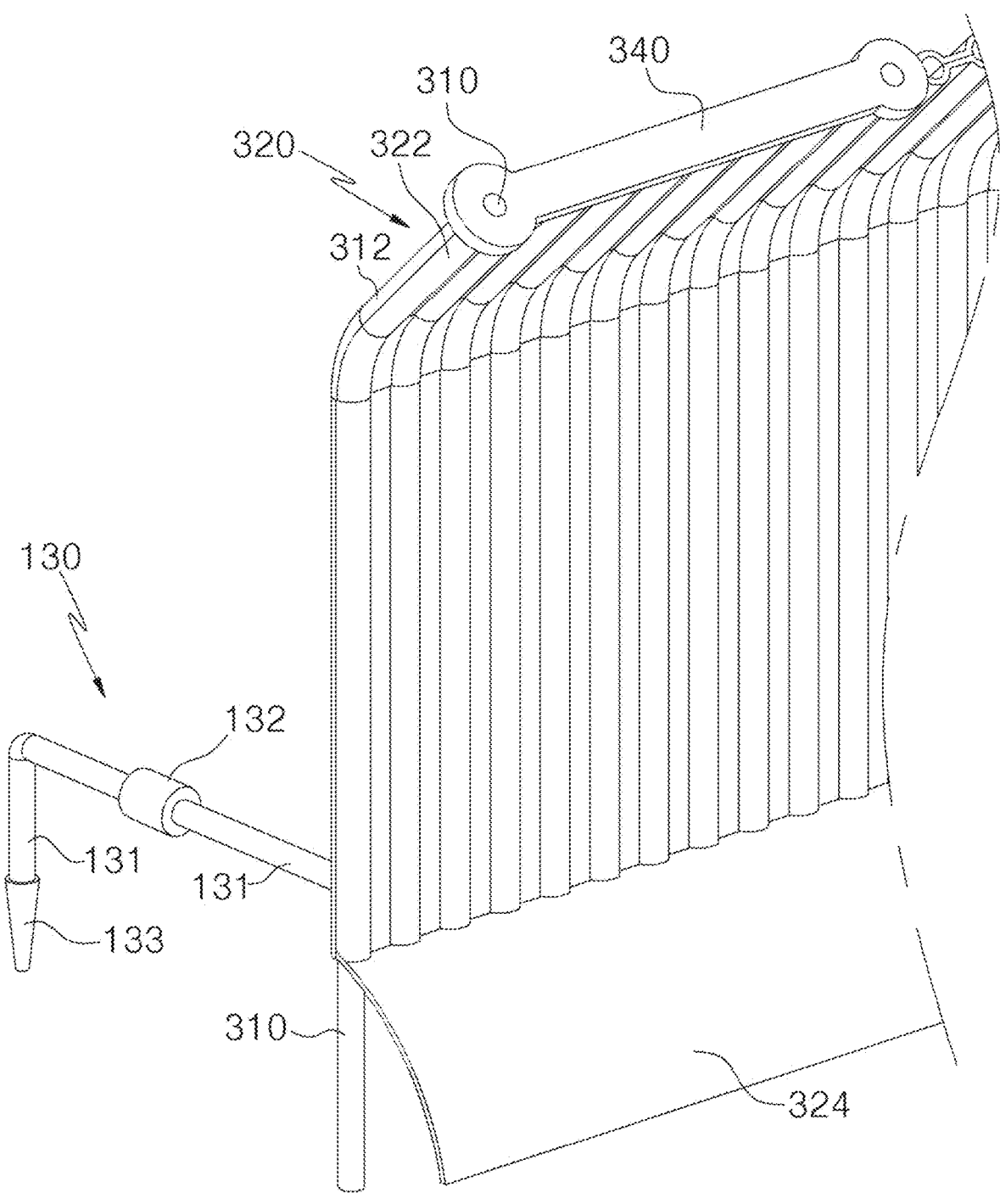
FIG. 7 is a perspective view of the apparatus for tree protection and tree disaster prevention according to still another embodiment of the present disclosure.

Hereinafter, preferred embodiments of the present disclosure will be described in detail with reference to the accompanying drawings. FIG. 1 is an exploded perspective view of an apparatus for tree protection and tree disaster prevention according to an embodiment of the present disclosure, FIG. 2 is a cross-sectional view of a blocking part constituting the apparatus for tree protection and tree disaster prevention according to an embodiment of the present disclosure, FIG. 3 is an exploded perspective view of the blocking part constituting the apparatus for tree protection and tree disaster prevention according to an embodiment of the present disclosure, FIG. 4 is an exemplary cross-sectional view illustrating an appearance in which the apparatus for tree protection and tree disaster prevention according to an embodiment of the present disclosure is installed adjacent to a curb, FIG. 5 is an exemplary cross-sectional view illustrating an appearance in which the apparatus for tree protection and tree disaster prevention according to an embodiment of the present disclosure is installed on the curb, FIG. 6 is an exemplary cross-sectional view illustrating an appearance in which an apparatus for tree protection and tree disaster prevention according to another embodiment of the present disclosure is installed on a curb in two stages, and FIG. 7 is a perspective view of the apparatus for tree protection and tree disaster prevention according to still another embodiment of the present disclosure.

As illustrated in FIG. 1, an apparatus for tree protection and tree disaster prevention according to an embodiment of the present disclosure includes a plurality of supports 110 that is provided with a predetermined spacing distance, a blocking part 120 that is fixed by the plurality of supports 110, a drip irrigation unit 130 that is provided on one side of a lower portion of a blocking wall 122 constituting the blocking part 120, and a scaling support part 140 that is interlocked and supported between the plurality of supports 110 and inserted into the blocking part 120.

The support 110 is in the form of a metal rod. The plurality of supports may be installed standing upright along a path between trees planted on a road and along a roadside with a predetermined spacing distance using galvanized steel wire that is resistant to corrosion, hard drawn steel wire having good elasticity, etc.

The blocking part 120 is formed long along the path where the supports 110 are installed, and is fixed by the plurality of supports 110. That is, the blocking part 120 is provided with a length corresponding to the entire range where the apparatus for tree protection and tree disaster prevention is to be installed, but the entire length may be formed integrally or may be provided in a state of being separated at certain sections for usability.

The blocking part 120 may include a blocking wall 122 with a plurality of through holes 126, as shown in FIG. 2, formed when a pair of front and rear sheets 122a and 122b are joined using, for example, a heat-compression sealer, and an extension 124 extending from the lower part of the blocking wall 122. In this case, optionally, both end portions of some through holes 126 may be blocked so that the through holes 126 are formed in the form of multiple air pockets, thereby forming multiple air pockets between the through holes 126.

Specifically, as illustrated in FIG. 3, the blocking part 120 may be formed by thermally compressing the front sheet 122a that is positioned in the front, forms multiple curves, and has an extension 124 connected to the lower portion, and the rear sheet 122b that is provided in a flat surface at the rear, by the heat-compression sealer.

In this case, an upper and lower length $t_1$ of the front sheet 122a is formed longer than an upper and lower length $t_{21}+t_{22}$ of the rear sheet 122b positioned in the rear, so the extension 124 may be formed at the bottom of the front sheet 122a after the sheets are attached to each other by the thermal compression.

The front sheet 122a may have a corona-treated surface, so patterns with various designs may be printed on the surface. In other words, various pictures, advertising designs, etc., may be printed on the surface of the front sheet 122a.

Here, a printing area where a red pigment is to be used for printing may be pre-painted with a black pigment, and the red pigment may be overprinted. The reason for pre-painting the printing area with the black pigment is that the red-based pigments are easily discolored when exposed to ultraviolet rays. Accordingly, the printing area is pre-painted with the black pigment so that the printing area of the red pigment remains.

In addition, a handle part with an additional length $t_{22}$ is provided on the top of the rear sheet 122b so that the user may easily perform the process of holding the handle part and inserting the support 110 into an arbitrary through hole 126, and may have a structure that allows harmful substances to be swirled to improve the blocking force.

The front sheet 122a and rear sheet 122b are formed of a polyethylene-based material such as low density polyethylene (LDPE) and a material containing an amine-based light stabilizer such as hindered amine light stabilizer (HALS) so that the front sheet 122a and rear sheet 122b have good low-temperature shrinkage, a wide range of bonding temperatures, and excellent light stability, so they are not easily deformed in shape even when exposed due to the installation on the roadside.

Alternatively, the front sheet 122a and rear sheet 122b are formed of a polyethylene material such as LDPE and a material containing an amine-based light stabilizer and a benzene-based UV stabilizer, so that the front sheet 122a and rear sheet 122b may prevent the color of the blocking wall 122 from fading due to photodegradation after being installed on the roadside.

The drip irrigation unit 130 is configured to be through-connected to the rear sheet 122b of the lower portion of the blocking wall 122, which forms each through hole 126 or the air pockets, and is extended, and insert water or nutrient solution contained therein into a root of a planted tree to perform drip irrigation after forming the plurality of through holes 126 in the form of the air pockets.

Specifically, the drip irrigation unit 130 includes a drip tube 131 that is through-connected to the rear sheet 122b of the lower portions of the air pockets formed by each through hole 126, a control valve 132 that is provided in the middle of the drip tube 131, and an insertion tube 133 that is provided in the end portion of the drip tube 131.

The drip tube 131 is a tube of a plastic material that is through-connected to the rear sheet 122b of the lower portion of the blocking wall 122 including the air pockets formed by the through holes 126 as illustrated in FIG. 1, and is through-connected to the lower portions of some of the through holes 126 where the support 110 is not provided.

The control valve 132 is provided in the middle of the drip tube 131 so that the user may control a flow rate of drip irrigation flowing in through the drip tube 131.

The insertion tube 133 is provided in the end portion of the drip tube 131 and is configured to be inserted into the root of the planted tree, and has a tapered shape that becomes thinner in the direction of the end portion. The insertion tube 133 is easy to be inserted into the soil of the root of the tree and fixed due to the tapered shape.

The sealing support part 140 includes a support rod 141 that is positioned between the supports 110, both end portions 142 of the support rod 141 that have fastening holes inserted into the end portions of the supports 110, and a plurality of sealing protrusions 143 that are inserted into each of the through holes 126 between the supports 110 along the lower surface of the support rod 141. The sealing support part 140 may be provided at the top or bottom of the plurality of through holes 126 positioned between the supports 110.

Accordingly, the tops and the bottoms of each of the plurality of through holes 126 may be blocked to form the air pockets. Of course, the sealing support part 140 may be positioned only at the tops of the plurality of through holes 126 positioned between the supports 110, and the bottoms of each of the plurality of through holes 126 may be bonded to form the air pockets.

By forming the plurality of through holes 126 in the form of the air pockets, after the apparatus for tree protection and tree disaster prevention is installed, the supporting force of the blocking wall 122 may be improved together with the sealing support part 140, thereby enhancing durability against strong external force such as strong wind.

In this case, some of the air pockets may be filled with water or nutrient solution, and drip-irrigate water or nutrient solution into planted trees through the drip irrigation unit 130 to facilitate drought relief and treatment of trees.

The apparatus for tree protection and tree disaster prevention according to an embodiment of the present disclosure configured in this manner is installed so that the support 110 is adjacent to a curb K as illustrated in FIG. 4, and the extension 124 is positioned to cover the curb K along a surface of the curb K.

As a result, the apparatus for tree protection and tree disaster prevention according to an embodiment of the present disclosure may completely block the gap formed at the bottom of the blocking wall 122 by the extension 124, thereby preventing the fatal damage from occurring due to the deicer from penetrating the root portion of the tree.

In general, when the snow removal work is performed, snow or other harmful substances are loaded onto the roadside by a snow removal vehicle, and then, as snow melts, a phenomenon occurs in which the snow or other harmful substances penetrate through the gap of the lower portion of the blocking wall. However, the apparatus for tree protection and tree disaster prevention according to an embodiment of the present disclosure may prevent secondary damage through ground absorption because such snow or other harmful substances are discharged along the surface of curb K to a road R side due to the extension 124.

In addition, the apparatus for tree protection and tree disaster prevention according to an embodiment of the present disclosure may be installed so that the support 110 contacts the front surface of the curb K as illustrated in FIG. 5. This is an installation method that may be applied when the space between the curb K and planted trees is narrow, and it hardly occupies the inside of the curb K.

In this case, the extension 124 may also sag further down than curb K to block the gap formed at the bottom of blocking wall 122. In this case, the lower end portion of support 110 may be fixed to the front surface of curb K by a separate fixing means.

Of course, the apparatus for tree protection and tree disaster prevention according to an embodiment of the present disclosure may be installed by various methods in addition to the installation method described above, and may also be installed in various locations such as flower beds, farms, and farmland, without limited to roadsides.

In addition, as an apparatus for tree protection and tree disaster prevention according to another embodiment of the present disclosure, as illustrated in FIG. 6, a fence structure may be installed on a curb in two stages. That is, the apparatus for tree protection and tree disaster prevention may be fastened with the upper portion of the apparatus for tree protection and tree disaster prevention according to an embodiment of the present disclosure illustrated in FIG. 5 to form the two-stage structure.

To this end, the apparatus for tree protection and tree disaster prevention according to another embodiment of the present disclosure is provided so that a support 111 constituting the lower apparatus for tree protection and tree disaster prevention has a screw shape at its end portion and is connected to a support 111 constituting the upper apparatus for tree protection and tree disaster prevention through a fastening member 210.

The apparatus for tree protection and tree disaster prevention according to another embodiment of the present disclosure is configured so that the upper apparatus for tree protection and tree disaster prevention is identical to the lower apparatus for tree protection and tree disaster prevention, but differs in that an auxiliary support member 130 constituting the lower apparatus for tree protection and tree disaster prevention is not present in the upper apparatus for tree protection and tree disaster prevention.

The apparatus for tree protection and tree disaster prevention according to another embodiment of the present disclosure may be configured and installed in two stages using the fastening members 210, thereby easily increasing the blocking height and further preventing harmful substances from having a negative effect on trees on roadside trees. Of course, the upper apparatus for tree protection and tree disaster prevention may be configured in the support 111 in three stages using another fastening member 210, thereby further increasing the blocking height.

As illustrated in FIG. 7, the apparatus for tree protection and tree disaster prevention according to still another embodiment of the present disclosure may be configured so that a blocking wall 322, an extension 324, a blocking part 320 that includes a plurality of through holes, a drip irrigation unit 330, and a sealing support part 340 that is inserted into the plurality of through holes in one end portion of the blocking part 320 are the same as those of the apparatus for tree protection and tree disaster prevention according to an embodiment of the present disclosure, but a support 310 may be formed differently from that of the apparatus for tree protection and tree disaster prevention according to an embodiment of the present disclosure.

Specifically, the support 310 of the apparatus for tree protection and tree disaster prevention according to still another embodiment of the present disclosure is formed so that the upper portion is bent forward at a predetermined angle, and thus, the blocking part 320 also has a form that is bent forward at a predetermined angle according to the shape of the support 310.

When the apparatus for tree protection and tree disaster prevention according to still another embodiment of the present disclosure configured in this way is installed, the phenomenon of harmful substances passing over the other side of the blocking part 320 along the rising air current may be prevented, and prevent cold dry wind from damaging to planted trees by generating an eddy.

In addition, although the spirit of the present disclosure has been described in detail according to the preferred embodiments, it is to be noted that the embodiments are provided in order to describe the present disclosure rather than limiting the present disclosure.

Further, it may be understood by those skilled in the art to which the present disclosure pertains that various embodiments are possible without departing from the spirit of the present disclosure.

The invention claimed is:

1. An apparatus for tree protection and tree disaster prevention, comprising:
   a plurality of supports that are provided with a predetermined spacing distance;
   a blocking part that is fixed by the plurality of supports; and
   a sealing support part that is interlocked and supported between the plurality of supports and inserted into the blocking part,
   wherein the blocking part includes a blocking wall in which a plurality of through holes are formed based on multiple curves by thermally compressing a front sheet with the multiple curves formed and a rear sheet formed as a flat surface, the plurality of supports are inserted into the plurality of through holes with the predetermined spacing distance, and the sealing support part includes a support rod that fixes two adjacent supports and the blocking wall between the two adjacent supports among the plurality of supports.

2. The apparatus of claim 1, further comprising: a drip irrigation unit that is provided on one side of a lower portion of the blocking wall constituting the blocking part.

3. The apparatus of claim 2, wherein the blocking wall is formed as an air pocket or a water pocket by connecting an extension to a lower portion of the front sheet and inserting a plurality of sealing protrusions formed along a lower surface of the support rod into at least some of the through holes.

4. The apparatus of claim 3, wherein the front sheet and the rear sheet are formed of a polyethylene-based material and a material containing an amine-based light stabilizer, or the polyethylene-based material and a material containing the amine-based light stabilizer and a benzene-based UV stabilizer, and a surface of the front sheet is a corona-treated surface.

5. The apparatus of claim 3, wherein the drip irrigation unit includes: a drip tube that is through-connected to a lower portion of the rear sheet corresponding to the air pocket or the water pocket; a control valve provided in a middle of the drip tube; and an insertion tube provided at an end portion of the drip tube.

6. The apparatus of claim 1, wherein the sealing support part includes: both end portions of the support rod that are provided with fastening holes inserted into end portions of the two adjacent supports; and a plurality of sealing protrusions that are inserted into each of the through holes of the blocking wall between the two adjacent supports along a lower surface of the support rod.

7. The apparatus of claim 1, wherein the support is provided in a form of a rod using galvanized steel wire or a hard drawn steel wire.

\* \* \* \* \*